United States Patent [19]

Smith

[11] 4,280,190
[45] Jul. 21, 1981

[54] INCREMENTER/DECREMENTER CIRCUIT

[75] Inventor: Philip S. Smith, Austin, Tex.

[73] Assignee: Motorola, Inc., Schaumburg, Ill.

[21] Appl. No.: 65,295

[22] Filed: Aug. 9, 1979

[51] Int. Cl.³ .............................................. G06F 7/50
[52] U.S. Cl. ................................ 364/770; 307/220 C; 364/747
[58] Field of Search .................. 307/205, 216, 220 C, 307/229; 340/799, 800, 801; 364/200, 200 MS File, 706, 747, 770; 365/190; 368/86, 87, 111, 219

[56] References Cited

U.S. PATENT DOCUMENTS

| | | | |
|---|---|---|---|
| 3,505,511 | 4/1970 | Campano et al. | 364/770 |
| 3,989,940 | 11/1976 | Kihara | 364/770 |
| 4,153,939 | 5/1979 | Kudou | 364/770 |
| 4,218,750 | 8/1980 | Carter et al. | 364/770 |

Primary Examiner—Larry N. Anagnos
Attorney, Agent, or Firm—Joe E. Barbee

[57] ABSTRACT

An increment/decrement circuit is provided which is implemented using CMOS transistors. The circuit has a minimum of interconnect lines to an adjoining increment/decrement circuit and also uses a reduced number of transistors. The increment/decrement circuit has a carry/borrow generator and has an increment/decrement output portion. The carry/borrow generator uses only three transistors plus an inverter and two coupling transistors. The increment/decrement output portion uses only six transistors.

6 Claims, 2 Drawing Figures 4,280,190

INCREMENTER/DECREMENTER CIRCUIT

This invention relates, in general, to an incrementer/decrementer circuit, and more particularly to an incrementer/decrementer circuit having field effect transistors and useful in digital data processing systems.

In many applications such as watch chips, timing circuits, and program counters used within a microprocessor it is desirable to provide incrementation or decrementation of certain digital information. As an example, in a data processing system such as a microprocessor or microcomputer, program instructions which are to be executed are normally stored in a memory in sequential order, i.e., as a program instruction is executed the following instruction to be executed is in adjacent memory cells. It is customary to have a program counter which is incremented as each instruction is executed so that the following instruction can then be retrieved from the memory system. In some microcomputer systems it may be desirable to increment an address storage register, a program counter register, and a stack pointer register. An incrementer circuit would increase by one the digital data stored in each of the respective registers serially. Previously, typical incrementer circuits consisted essentially of exclusive OR circuits and AND gate circuits. In the past, some incrementer circuits were merely incrementers and did not have the capability to decrement as well as increment. In addition, a versatile increment or decrement circuit would contain a large number of transistors.

Accordingly, it is an object of the present invention to provide an incrementer/decrementer circuit which has a reduced number of circuit elements and yet has the capability of both incrementing or decrementing.

Another object of the present invention is to provide an incrementer/decrementer circuit which is compact in layout and requires a reduced number of interconnect lines between bit storage locations of a register having a plurality of incrementer/decrementer circuits.

SUMMARY OF THE INVENTION

In carrying out the above and other objects of the present invention, there is provided, in one form, an incrementer/decrementer circuit having a carry/borrow generator section and an increment/decrement output section. The carry/borrow generator receives a carry input and provides a carry output and also controllably receives a data bit or its complement. The data bit and its complement are gated to the carry/borrow generator by a first and a second controllable means. The carry input to the carry/borrow generator is received by gate electrodes of series connected P channel and N channel transistors. An output is obtained from a node formed between the P and N channel transistors and is inverted by an inverter which provides the carry output. The output of the inverter is also used to control a feedback means to form a latch around the inverter when the carry out is of a predetermined logic level. The data bit and its complement along with the carry input signal are also coupled to the increment/decrement output portion of the circuit. The output portion of the circuit uses six field effect transistors to generate the increment/decrement output.

The subject matter which is regarded as the invention is particularly pointed out and distinctly claimed in the concluding portion of this specification. The invention itself, however, together with further objects and advantages thereof, may be better understood by referring to the following description taken in conjunction with the accompanying drawings.

DETAILED DESCRIPTION OF THE DRAWINGS

Figure 1:
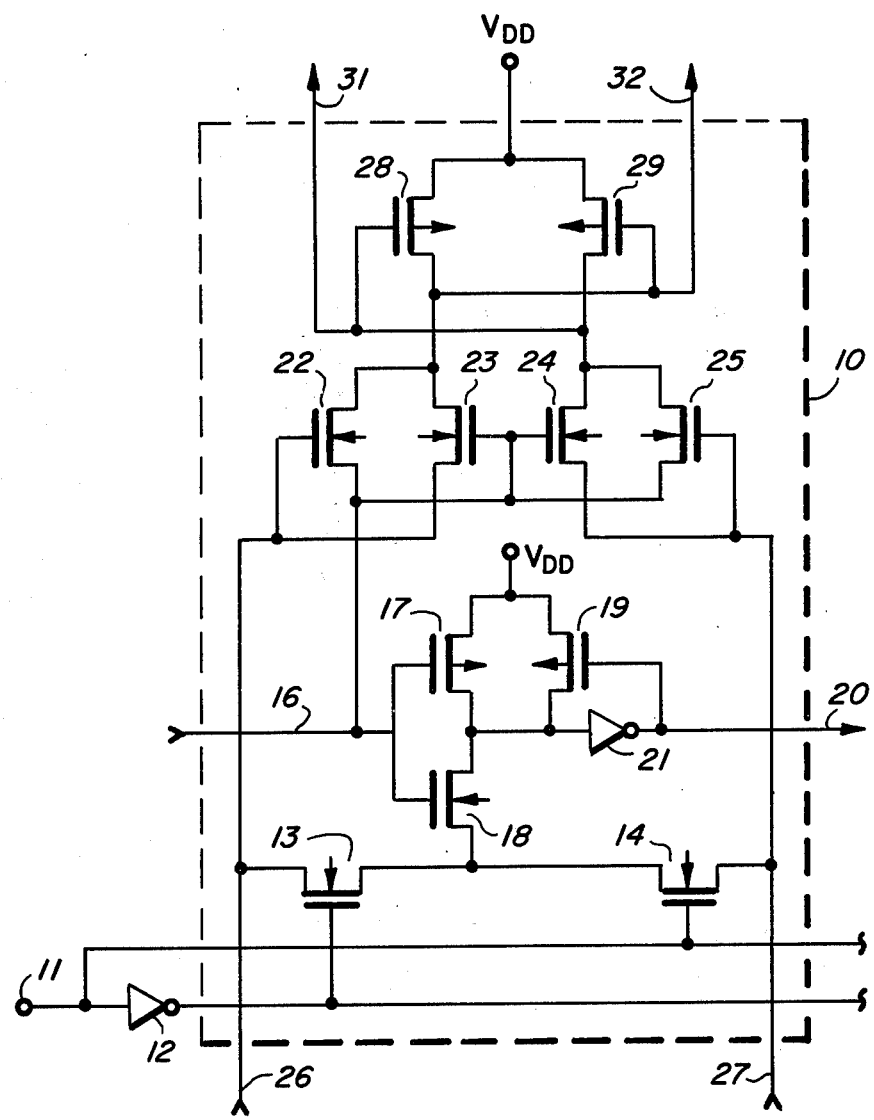
FIG. 1 is a schematic diagram of the present invention in one form thereof.

Referring first to FIG. 1, there is illustrated an incrementer/decrementer circuit 10 receiving a control signal at input 11. The control signal is an increment/decrement command which controls N channel transistors 13 and 14. The increment/decrement command is coupled from input 11 to a gate electrode of transistor 14, and is inverted by inverter 12 and coupled to a gate electrode of transistor 13. Transistors 13 and 14 serve as controllable means for coupling inputs from inputs 26 and 27, respectively, to a source electrode of N channel transistor 18. N channel transistor 18 has its gate electrode connected to a gate electrode of a P channel transistor 17. The gate electrodes of transistors 17 and 18 are coupled to an input 16 which is a carry input. Transistors 17 and 18 are connected in series between a voltage terminal $V_{DD}$ and a node formed between transistors 13 and 14. A node which is formed between transistors 17 and 18 is coupled to an input of inverter 12. Inverter 21 provides an output on output line 20 which is the carry/borrow output. The output of inverter 21 is also connected to a gate electrode of a P channel transistor 19. P channel transistor 19 is coupled from voltage terminal $V_{DD}$ to the input of inverter 21 and forms a feedback means around inverter 21. Transistor 19 is only made conductive when the output of inverter 21 is a logic level low. A logic level low on the gate electrode of transistor 19 causes transistor 19 to conduct and maintain a logic level high at the input of inverter 21 thereby latching inverter 21 in a state to produce a logic level low output. Transistors 17, 18, 19, and 21 form a carry/borrow generator having controllable means 13 and 14 for coupling data bits or their complements from lines 26 and 27.

A P channel transistor 28 is connected in series with an N channel transistor 23 between voltage terminal $V_{DD}$ and data input line 26. An output node is formed between transistors 23 and 28 and is connected to increment/decrement output 32. An N channel transistor 22 is coupled between output 32 and carry input 16. Transistor 22 has its gate electrode coupled to data input 26. A P channel transistor 29 is coupled in series with an N channel transistor 24 between voltage terminal $V_{DD}$ and data input 27. An output node is formed between transistors 24 and 29 and is coupled to increment/decrement output 31. An N channel transistor 25 is coupled between output 31 and carry input 16. Transistor 25 has its gate electrode coupled to input 27. In a preferred embodiment, transistors 28 and 29 are P channel transistors, however, it will be noted that other suitable load devices could be substituted for transistors 28 and 29.

Data input 27 is a complement of data input 26. Increment/decrement outputs 31 and 32 are also complements of each other. Increment/decrement output 31 will be a logic level high when both inputs 16 and 27 are logic levels low or logic levels high. When output 31 is a logic level high then output 32 will be a logic level low. Increment/decrement output 32 will be a logic level high when both inputs 16 and 26 are both logic level lows or are both logic level highs. Circuit 10 is an incrementer when increment/decrement input 11 is held at a logic level low and is a decrementer when input 11 is held at a logic level high.

Figure 2:
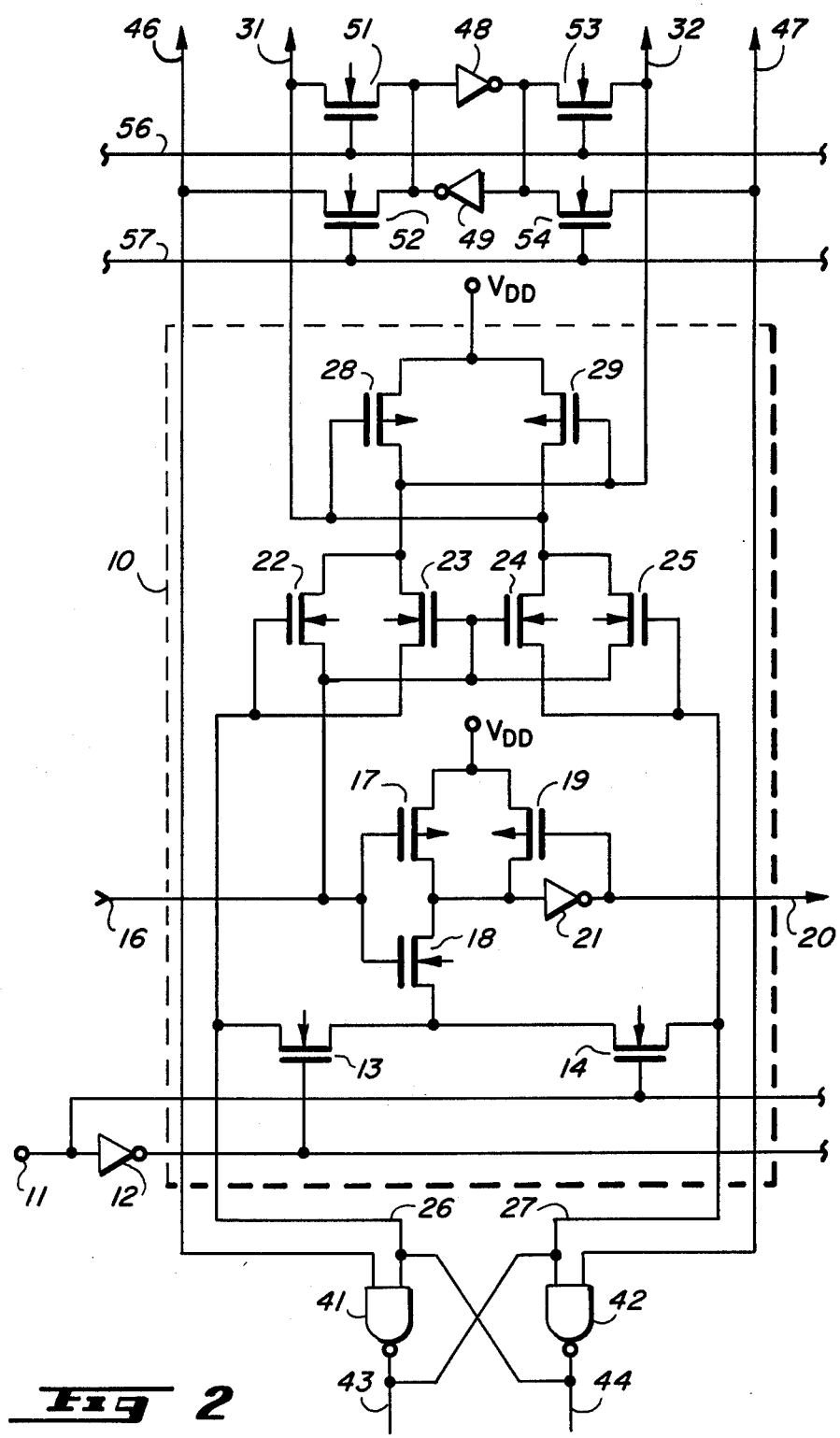
FIG. 2 illustrates the circuit of FIG. 1 in combination with portions of a microprocessor.

Increment/decrement circuit 10 can be used in watch circuits or timing control circuits wherever an increment/decrement circuit is required. In FIG. 2 a specific example of the use of circuit 10 in a microprocessor is illustrated. Typically, an 8-bit microprocessor would contain at least eight increment/decrement circuits 10. The circuits 10 would be interconnected so that the carry input 16 of one would receive the carry output 20 of the preceeding circuit. The outputs 31 and 32 would each go to a respective storage cell of registers which are to be incremented or decremented. Examples of such registers could be an address storage register, a program counter register, and a stack pointer.

Referring now to FIG. 2 the same reference numerals used in FIG. 1 are used in FIG. 2 for the same elements. Output 31 is shown coupled to a pair of back-to-back inverters 48 and 49 by an N channel transistor 51. Inverters 48 and 49 form a latch or storage location of a typical static register. Transistor 51 has its gate electrode connected to line 56 which could carry a control signal such as an address store load command. Inverters 48 and 49 are also coupled to a bus 46 by an N channel transistor 52. Bus 46 could be an address bus within a microprocessor. Transistor 52 has its gate electrode connected to a line 57 which would carry a control signal such as a bus load command. Output 32 is coupled to inverters 48 and 49 by an N channel transistor 53 which has its gate electrode connected to control line 56. Inverters 48 and 49 are also coupled to a bus 47 by an N channel transistor 54 which is controlled by a control signal on line 57. It should be noted that buses 46 and 47 will carry complementary signals. Transistors 52 and 54 are enabled by the same command signal carried on line 57 and will accordingly couple the true and its complement output to buses 46 and 47. The true and its complement are stored in the latch formed by inverters 48 and 49. Buses 46 and 47 are coupled to an output latch formed by a cross coupled pair of NAND gates 41 and 42. The output latch formed by logic gates 41 and 42 couples buses 46 and 47 to buses 43 and 44. This arrangement will cause buses 43 and 44 to be static buses. NAND gate 41 has a first input connected to bus 46 and a second input connected to the output from NAND gate 42, which is bus 44. Line 26 is also connected to output bus 44, and as discussed hereinbefore, line 26 serves as an input for increment/decrement circuit 10. NAND gate 41 has its first input connected to bus 47 and its second input connected to the output of NAND gate 41 which is also output bus 43. Line 27 is also connected to output bus 43.

By now it should be appreciated that there has been provided an increment/decrement circuit which has a reduced number of interconnect lines between other stages of a plurality of increment/decrement circuits. In addition, a carry/borrow generator is provided having three transistors plus an inverter and two transistors for coupling input data. The output section of the increment/decrement circuit has two P channel transistors and four N channel transistors.

I claim:

1. An incrementer/decrementer circuit, comprising: a first input for receiving a carry-in signal; a second input for receiving an increment input; a third input for receiving a decrement input; a fourth and a fifth input for receiving complementary inputs; a first and a second output for providing outputs for the incrementer/decrementer circuit; a third output for providing a carry-out output; a first and a second transistor coupled in series between the fourth and fifth inputs, the first transistor having a gate electrode coupled to the third input, the second transistor having a gate electrode coupled to the second input, the first and second transistors forming a first node therebetween; a third and fourth transistor coupled in series between the first node and a first power supply terminal, the third and fourth transistors forming a second node therebetween and having gate electrodes coupled to the first input; an inverter coupled between the second node and the third output; feedback means coupled to the inverter to form a latch with the inverter; a fifth and sixth transistor having a first and a second current carrying electrode and a gate electrode, the first electrode of the fifth and sixth transistor being coupled to the second output, the gate electrode of the fifth transistor being coupled to the fourth input, the gate electrode of the sixth transistor being coupled to the first input, the second electrode of the fifth transistor being coupled to the first input, the second electrode of the sixth transistor being coupled to the fourth input; seventh and eighth transistors having first electrodes coupled to the first output, and having second and gate electrodes, the gate electrode of the seventh transistor being coupled to the first input, the seventh transistor having its second electrode coupled to the fifth input, the gate electrode of the eighth transistor being coupled to the fifth input, the second electrode of the eighth transistor being coupled to the first input; and ninth and tenth transistors having first electrodes coupled to the first voltage terminal, the ninth transistor having a second electrode coupled to the second output and having a gate electrode coupled to the first output, the tenth transistor having a second electrode coupled to the first output and having a gate electrode coupled to the second output.

2. The incrementer/decrementer circuit of claim 1 wherein the increment and decrement inputs are complements of each other.

3. The incrementer/decrementer circuit of claim 1 wherein all the transistors are field effect transistors.

4. The incrementer/decrementer circuit of claim 1 wherein the first, second, fourth, fifth, sixth, seventh and eighth transistors are N channel transistors, and the third, ninth, and tenth transistors are P channel transistors.

5. The incrementer/decrementer circuit of claim 1 wherein the feedback means is a P channel transistor having a first electrode coupled to the first power supply terminal, a second electrode coupled to the second node, and having a gate electrode coupled to the third output.

6. An incrementer/decrementer circuit having a carry input, a carry output, a first and a second control input, a first and second data input and a first and a second data output, comprising: a first node; first controllable means for coupling the first data input to the first node; second controllable means for coupling the second data input to the first node; means for providing a carry-out to the carry output and having a first and a second input, the first input being coupled to the first node and the second input being coupled to the carry input; a first and a second field effect transistor coupled in series between a power supply terminal and the first data input, the first and second transistors forming a second node therebetween which is coupled to the second output, the first transistor having a gate electrode coupled to the carry input; a third field effect transistor coupled between the second node and the carry input and having a gate electrode coupled to the first data input; a fourth and fifth field effect transistor coupled between the power supply terminal and the second data input and forming a third node therebetween, the third node being coupled to the first output, the fourth transistor having a gate electrode coupled to the carry input, the fifth transistor having a gate electrode coupled to the second node, the second transistor having a gate electrode coupled to the third node; and a sixth transistor coupled between the third node and the carry input and having a gate electrode coupled to the second data input, wherein the first controllable means is controlled by the first control input and the second controllable means is controlled by the second control input.

* * * * *